United States Patent
Ling et al.

(10) Patent No.: US 9,442,676 B2
(45) Date of Patent: Sep. 13, 2016

(54) METHOD, DEVICE, AND SYSTEM FOR DETERMINING DRIVE LETTER

(71) Applicant: Huawei Technologies Co., Ltd., Shenzhen (CN)

(72) Inventors: Huabing Ling, Shenzhen (CN); Xin Qiu, Shenzhen (CN); Rong Luo, Shenzhen (CN); Zhijun Wei, Shenzhen (CN); Jie Cao, Shenzhen (CN); Kaitian Du, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 139 days.

(21) Appl. No.: 14/061,501

(22) Filed: Oct. 23, 2013

(65) Prior Publication Data

US 2014/0047180 A1  Feb. 13, 2014

Related U.S. Application Data

(63) Continuation of application No. PCT/CN2012/078688, filed on Jul. 16, 2012.

(51) Int. Cl.
*G06F 7/00* (2006.01)
*G06F 3/06* (2006.01)
*G06F 11/10* (2006.01)

(52) U.S. Cl.
CPC .......... *G06F 3/0689* (2013.01); *G06F 3/0604* (2013.01); *G06F 3/0605* (2013.01); *G06F 3/0629* (2013.01); *G06F 3/0632* (2013.01); *G06F 11/1076* (2013.01)

(58) Field of Classification Search
CPC .......................... G06F 3/0689; G06F 11/1076
See application file for complete search history.

(56) References Cited

U.S. PATENT DOCUMENTS

| | | | | |
|---|---|---|---|---|
| 2005/0125426 A1* | 6/2005 | Minematsu | ........... | G06F 3/0605 |
| 2007/0094472 A1* | 4/2007 | Marks et al. | ................. | 711/170 |
| 2012/0137068 A1* | 5/2012 | Zeng | ............................. | 711/114 |
| 2012/0317357 A1* | 12/2012 | Kopylovitz | ........... | G06F 3/0607 |
| | | | | 711/114 |

FOREIGN PATENT DOCUMENTS

JP  2009266112 A  * 11/2009
KR  20000034323 A  6/2000

OTHER PUBLICATIONS

Ju Seok Man (KR19980051627, Application date: Nov. 28, 1998).*

* cited by examiner

*Primary Examiner* — Ryan Bertram
*Assistant Examiner* — Trang Ta
(74) *Attorney, Agent, or Firm* — Brinks Gilson & Lione

(57) ABSTRACT

The present disclosure discloses a method for determining a drive letter, including: obtaining a number of a port connecting a redundant array of independent disk RAID controller to an exchange chip and a location number, of a disk, meeting a report condition in each RAID group under the control of the RAID controller, where the location number, of the disk, meeting the report condition is a location number, of a disk, on a preset location after location numbers of all disks included in each RAID group when each RAID group is configured, are sorted according to a preset sequence; and determining a drive letter corresponding to each RAID group according to the number of the port connecting the RAID controller to the exchange chip and the location number, of the disk, meeting the report condition in each RAID group.

7 Claims, 8 Drawing Sheets

```
┌─────────────────────────────────────────────────┐
│   A central processing unit obtains a number of a port      │
│   connecting a RAID controller to an exchange chip and a    │──── 101
│   location number, of a disk, meeting a report condition in │
│   each RAID group under the control of the RAID controller  │
└─────────────────────────────────────────────────┘
                          │
                          ▼
┌─────────────────────────────────────────────────┐
│     The central processing unit determines a drive letter   │
│   corresponding to each RAID group according to the number  │──── 102
│   of the port connecting the RAID controller to the exchange│
│   chip and the location number, of the disk, meeting report │
│              condition in each RAID group                   │
└─────────────────────────────────────────────────┘
```

METHOD, DEVICE, AND SYSTEM FOR DETERMINING DRIVE LETTER

CROSS-REFERENCE TO RELATED APPLICATIONS

This application is a continuation of International Application No. PCT/CN2012/078688, filed on Jul. 16, 2012, which is hereby incorporated by reference in its entirety.

FIELD

The present disclosure relates to the field of information technologies, and in particular, to a method, a device, and a system for determining a drive letter.

BACKGROUND

At present, most of servers generally adopt a storage structure where a plurality of disks is connected to a redundant array of independent disk (RAID, Redundant array of Independent Disk) controller. A plurality of disks in common use connected to the RAID controller may be flexibly configured to a RAID group, for example, 5 disks are configured to a RAID group.

In the case where a plurality of disks exists in a system, a plurality of disks under the control of the same RAID controller is configured to several RAID groups, for example, disks 1, 2, and 3 are configured to a RAID group, disks 4, 5, and 6 are configured to a RAID group, and disks 7, 8, and 9 are configured to a RAID group; and because data stored in each RAID group is generally different, an operating system distributes a drive letter to each RAID group for a user to use. For example, the RAID group formed by the disks 1, 2, and 3 has a drive letter of sdb and stores a file A; the RAID group formed by the disks 4, 5, and 6 has a drive letter of sdc and stores a file B; and the RAID group formed by the disks 7, 8, and 9 has a drive letter of sdd and stores a file C.

In the prior art, a drive letter of each RAID group is distributed by an operating system according to a sequence in which RAID groups are added. However, after every time the system is restarted or the disk is unplugged and plugged, it cannot be ensured that every time the RAID groups are added in the same sequence. Therefore, after every time the system is restarted or a disk is unplugged and plugged, the drive letter of each RAID group may be different so that the user cannot accurately find data stored in a RAID group.

SUMMARY

Embodiments of the present disclosure provide a method for determining a drive letter, which may ensure that a drive letter remains the same after every time a system is restarted or a disk is unplugged and plugged. The embodiments of the present disclosure further provide a corresponding device and system.

In a first aspect, the present disclosure provides a method for determining a drive letter, including: obtaining a number of a port connecting a redundant array of independent disk RAID controller to an exchange chip and a location number, of a disk, meeting a report condition in each RAID group under the control of the RAID controller, where the location number, of the disk, meeting the report condition is a location number, of a disk, on a preset location after location numbers of all disks included in each RAID group when each RAID group is configured, are sorted according to a preset sequence; and determining a drive letter corresponding to each RAID group according to the number of the port connecting the RAID controller to the exchange chip and the location number, of the disk, meeting the report condition in each RAID group.

In combination of the first aspect, in a first possible implementation manner, the obtaining a number of a port connecting a RAID controller to an exchange chip and a location number, of a disk, meeting a report condition in each RAID group under the control of the RAID controller includes: receiving the number of the port connecting the RAID controller to the exchange chip and the location number, of the disk, meeting the report condition in each RAID group under the control of the RAID controller, where the number of the port and the location number of the disk are reported by the RAID controller.

In combination of the first aspect, in a second possible implementation manner, the obtaining a number of a port connecting a RAID controller to an exchange chip and a location number, of a disk, meeting a report condition in each RAID group under the control of the RAID controller includes: receiving the number of the port connecting the RAID controller to the exchange chip and location numbers of all disks in each RAID group under the control of the RAID controller, where the number of the port and the location numbers of all disks are reported by the RAID controller; and searching for the location numbers of all the disks included, when each RAID group is configured, in each RAID group according to the location numbers of all the disks in each RAID group, sorting the location numbers of all the disks included, when each RAID group is configured, in each RAID group according to the preset sequence, and selecting the location number, of the disk, on the preset location after the sorting as the location number, of the disk, meeting the report condition in each RAID group.

In combination of the first aspect, the first possible implementation manner of the first aspect, or the second possible implementation manner of the first aspect, in a third possible implementation manner, the drive letter corresponding to each RAID group includes two arguments, and the determining a drive letter corresponding to each RAID group according to the number of the port connecting the RAID controller to the exchange chip and the location number, of the disk, meeting the report condition in each RAID group includes: using the number of the port connecting the RAID controller to the exchange chip as one argument in the drive letter corresponding to each RAID group, and using the location number, of the disk, meeting the report condition in each RAID group as the other argument in the drive letter corresponding to each RAID group.

In a second aspect, the present disclosure provides a method for determining a drive letter, including: obtaining, by a redundant array of independent disk RAID controller, a number of a port connecting the RAID controller to an exchange chip and location numbers of all disks in each RAID group under the control of the RAID controller; determining, by the RAID controller, a location number, of a disk, meeting a report condition in each RAID group according to the location numbers of all the disks in each RAID group; and sending, to a central processing unit by the RAID controller, the number of the port connecting the RAID controller to the exchange chip and the location numbers of all the disks in each RAID group, so that the central processing unit determines the location number, of the disk, meeting the report condition in each RAID group according to the location numbers of all the disks in each RAID group; or sending, to the central processing unit, the number of the port connecting the RAID controller to the exchange chip and the location number, of the disk, meeting the report condition in each RAID group, so that the central processing unit determines a drive letter corresponding to each RAID group according to the number of the port connecting the RAID controller to the exchange chip and the location number, of the disk, meeting the report condition in each RAID group, where the location number, of the disk, meeting the report condition is a location number, of a disk, on a preset location after location numbers of all disks included in each RAID group when each RAID group is configured, are sorted according to a preset sequence.

In combination of the second aspect, in a first possible implementation manner, the determining, by the RAID controller, a location number, of a disk, meeting a report condition in each RAID group according to the location numbers of all the disks in each RAID group includes: searching for the location numbers of all the disks included, when each RAID group is configured, in each RAID group according to the location numbers of all the disks in each RAID group; and sorting the location numbers of all the disks included, when each RAID group is configured, in each RAID group according to the preset sequence, and selecting the location number, of the disk, on the preset location after the sorting as the location number, of the disk, meeting the report condition in each RAID group.

In combination of the second aspect, in a second possible implementation manner, after the obtaining, by the RAID controller, location numbers of all disks in each RAID group under the control, the method further includes: querying, by the RAID controller, for the number of the disks included, when each RAID group is configured, in each RAID group according to the location numbers of all the disks in each RAID group; and the sending, to a central processing unit by the RAID controller, the number of the port connecting the RAID controller to the exchange chip and the location numbers of all the disks in each RAID group includes: sending, to the central processing unit by the RAID controller, the number of the port connecting the RAID controller to the exchange chip and the location numbers of all the disks in each RAID group when the number of the disks included in each RAID group is different from the number of the disks included when each RAID group is configured.

In a third aspect, the present disclosure provides a central processing unit, including: a first obtaining unit, configured to obtain a number of a port connecting a RAID controller to an exchange chip and a location number, of a disk, meeting a report condition in each RAID group under the control of the RAID controller, where the location number, of the disk, meeting the report condition is a location number, of a disk, on a preset location after location numbers of all disks included in each RAID group when each RAID group is configured, are sorted according to a preset sequence; and a first determination unit, configured to determine a drive letter corresponding to each RAID group according to the number of the port connecting the RAID controller to the exchange chip and the location number, of the disk, meeting the report condition in each RAID group, where the number of the port and the location number of the disk are obtained by the first obtaining unit.

In combination of the third aspect, in a first possible implementation manner, the first obtaining unit includes: a first receiving subunit, configured to receive the number of the port connecting the RAID controller to the exchange chip and the location number, of the disk, meeting the report condition in each RAID group under the control of the RAID controller, where the number of the port and the location number of the disk are reported by the RAID controller.

In combination of the third aspect, in a second possible implementation manner, the first obtaining unit includes: a second receiving subunit, configured to receive the number of the port connecting the RAID controller to the exchange chip and location numbers of all disks in each RAID group under the control of the RAID controller, where the number of the port and the location numbers of all disks are reported by the RAID controller; a first search subunit, configured to search for location numbers of all disks included, when each RAID group is configured, in each RAID group according to the location numbers of all the disks in each RAID group received by the second receiving subunit; a first sorting subunit, configured to sort, according to the preset sequence, the location numbers of all the disks included, when each RAID group is configured, in each RAID group found by the first search subunit; and a first selection subunit, configured to select the location number, of the disk, on the preset location after the sorting of the first sorting subunit as the location number, of the disk, meeting the report condition in each RAID group.

In combination of the third aspect, the first possible implementation manner of the third aspect, or the second possible implementation manner of the third aspect, in a third possible implementation manner, the drive letter corresponding to each RAID group includes two arguments, and the first determination unit is configured to use the number of the port connecting the RAID controller to the exchange chip as one argument in the drive letter corresponding to each RAID group, and use the location number, of the disk, meeting the report condition in each RAID group as the other argument in the drive letter corresponding to each RAID group.

In a fourth aspect, the present disclosure provides a redundant array of independent disk controller, including: a second obtaining unit, configured to obtain a number of a port connecting the RAID controller to an exchange chip and location numbers of all disks in each RAID group under the control of the RAID controller; a second determination unit, configured to determine a location number, of a disk, meeting a report condition in each RAID group according to the location numbers of all the disks in each RAID group obtained by the second obtaining unit; and a sending unit, configured to send, to a central processing unit, the number of the port connecting the RAID controller to the exchange chip and the location numbers of all the disks in each RAID group under the control of the RAID controller, where the number of the port and the location number of the disk are obtained by the second obtaining unit, so that the central processing unit determines the location number, of the disk, meeting the report condition in each RAID group according to the location numbers of all the disks in each RAID group; or send, to the central processing unit, the number of the port connecting the RAID controller to the exchange chip obtained by the second obtaining unit and the location number, of the disk, meeting the report condition in each RAID group determined by the second determination unit, so that the central processing unit determines a drive letter corresponding to each RAID group according to the number of the port connecting the RAID controller to the exchange chip and the location number, of the disk, meeting the report condition in each RAID group, where the location number, of the disk, meeting the report condition is a location number, of a disk, on a preset location after location numbers of all disks included in each RAID group when each RAID group is configured, are sorted according to a preset sequence.

In combination of the fourth aspect, in a first possible implementation manner, the second determination unit includes: a second search subunit, configured to search for the location numbers of all the disks included, when each RAID group is configured, in each RAID group according to the location numbers of all the disks in each RAID group; and a second sorting subunit, configured to sort, according to the preset sequence, the location numbers of all the disks included, when each RAID group is configured, in each RAID group found by the second search subunit; and a second selection subunit, configured to select the location number, of the disk, on the preset location after the sorting of the second sorting subunit as the location number, of the disk, meeting the report condition in each RAID group.

In combination of the fourth aspect, in a second possible implementation manner, the redundant array of independent disk controller further includes: a query unit, configured to query for the number of the disks included, when each RAID group is configured, in each RAID group according to the location numbers of all the disks in each RAID group; and the sending unit is configured to send the number of the port connecting the RAID controller to the exchange chip and the location numbers of all the disks in each RAID group to the central processing unit when the number of the disks included in each RAID group found by the query unit is different from the number of the disks included when each RAID group is configured.

In a fifth aspect, the present disclosure provides a computer storage medium, where the computer storage medium is capable of storing a program, and when being executed, the program includes a part or all of steps of the method for determining a drive letter in the first aspect and the alternative manners of the first aspect.

In a sixth aspect, the present disclosure provides a computer storage medium, where the computer storage medium is capable of storing a program, and when being executed, the program includes a part or all of steps of the method for determining a drive letter in the second aspect and the alternative manners of the second aspect.

In a seventh aspect, the present disclosure provides a device for determining a drive letter, including: a first input apparatus, a first output apparatus, a first memory, and a first processor, where the first processor executes the following steps: obtaining a number of a port connecting a redundant array of independent disk RAID controller to an exchange chip and a location number, of a disk, meeting a report condition in each RAID group under the control of the RAID controller, where the location number, of the disk, meeting the report condition is a location number, of a disk, on a preset location after location numbers of all disks included in each RAID group when each RAID group is configured, are sorted according to a preset sequence; and determining a drive letter corresponding to each RAID group according to the number of the port connecting the RAID controller to the exchange chip and the location number, of the disk, meeting the report condition in each RAID group.

In combination of the seventh aspect, in a first possible implementation manner, the first processor receives the number of the port connecting the RAID controller to the exchange chip and the location number, of the disk, meeting the report condition in each RAID group under the control of the RAID controller, where the number of the port and the location number of the disk are reported by the RAID controller.

In combination of the seventh aspect, in a second possible implementation manner, the first processor receives the number of the port connecting the RAID controller to the exchange chip and location numbers of all disks in each RAID group under the control of the RAID controller, where the number of the port and the location numbers of all disks are reported by the RAID controller; searches for the location numbers of all the disks included, when each RAID group is configured, in each RAID group according to the location numbers of all the disks in each RAID group, sorts the location numbers of all the disks included, when each RAID group is configured, in each RAID group according to the preset sequence, and selects the location number, of the disk, on the preset location after the sorting as the location number, of the disk, meeting the report condition in each RAID group.

In combination of the seventh aspect, the first possible implementation manner of the seventh aspect, or the second possible implementation manner of the seventh aspect, in the first possible implementation manner, the drive letter corresponding to each RAID group includes two arguments, and the first processor uses the number of the port connecting the RAID controller to the exchange chip as one argument in the drive letter corresponding to each RAID group, and uses the location number, of the disk, meeting the report condition in each RAID group as the other argument in the drive letter corresponding to each RAID group.

In an eighth aspect, the present disclosure provides a device for determining a drive letter, including: a second input apparatus, a second output apparatus, a second memory, and a second processor, where the second processor executes the following steps: obtaining a number of a port connecting a RAID controller to an exchange chip and location numbers of all disks in each RAID group under the control of the RAID controller; determining a location number, of a disk, meeting a report condition in each RAID group according to the location numbers of all the disks in each RAID group; and sending, to a central processing unit, the number of the port connecting the RAID controller to the exchange chip and the location numbers of all the disks in each RAID group, so that the central processing unit determines the location number, of the disk, meeting the report condition in each RAID group according to the location numbers of all the disks in each RAID group; or sending, to the central processing unit, the number of the port connecting the RAID controller to the exchange chip and the location number, of the disk, meeting the report condition in each RAID group, so that the central processing unit determines a drive letter corresponding to each RAID group according to the number of the port connecting the RAID controller to the exchange chip and the location number, of the disk, meeting the report condition in each RAID group, where the location number, of the disk, meeting the report condition is a location number, of a disk, on a preset location after location numbers of all disks included in each RAID group when each RAID group is configured, are sorted according to a preset sequence.

In combination of the eighth aspect, in a first possible implementation manner, the second processor searches for the location numbers of all the disks included, when each RAID group is configured, in each RAID group according to the location numbers of all the disks in each RAID group, sorts the location numbers of all the disks included, when each RAID group is configured, in each RAID group according to the preset sequence, and selects the location number, of the disk, on the preset location after the sorting as the location number, of the disk, meeting the report condition in each RAID group.

In combination of the eighth aspect, in a second possible implementation manner, the second processor queries for the number of the disks included, when each RAID group is configured, in each RAID group according to the location numbers of all the disks in each RAID group; and when the number of the disks included in each RAID group is different from the number of the disks included when each RAID group is configured, the second processor sends, to the central processing unit, the number of the port connecting the RAID controller to the exchange chip and the location numbers of all the disks in each RAID group.

In a ninth aspect, the present disclosure provides a system for determining a drive letter, including: a central processing unit and a redundant array of independent disk controller, where the central processing unit is the central processing unit in the foregoing third aspect and the alternative manners of the third aspect, and the redundant array of independent disk controller is the redundant array of independent disk controller in the foregoing fourth aspect and the alternative manners of the fourth aspect.

In the embodiments of the present disclosure, the number of the port connecting the redundant array of independent disk RAID controller to the exchange chip and the location number, of the disk, meeting the report condition in each RAID group under the control of the RAID controller are obtained, where the location number, of the disk, meeting the report condition is the location number, of the disk, on the preset location after the location numbers of all the disks included in each RAID group when each RAID group is configured, are sorted according to the preset sequence; and the drive letter corresponding to each RAID group is determined according to the number of the port connecting the RAID controller to the exchange chip and the location number, of the disk, meeting the report condition in each RAID group. Compared with the prior art where after the system is restarted or the disk is unplugged and plugged, the drive letter of each RAID group may be different, the solutions provided by the embodiments of the present disclosure may ensure that after every time the system is restarted or the disk is unplugged and plugged, the drive letter remains the same, so that a user can accurately find stored data.

DETAILED DESCRIPTION OF THE EMBODIMENTS

Embodiments of the present disclosure provide a method for determining a drive letter, which may ensure that after every time a system is restarted or a disk is unplugged and plugged, a drive letter remains the same. The embodiments of the present disclosure further provide a corresponding apparatus and system. The following describes the method, device, and system respectively in detail.

Figure 1:
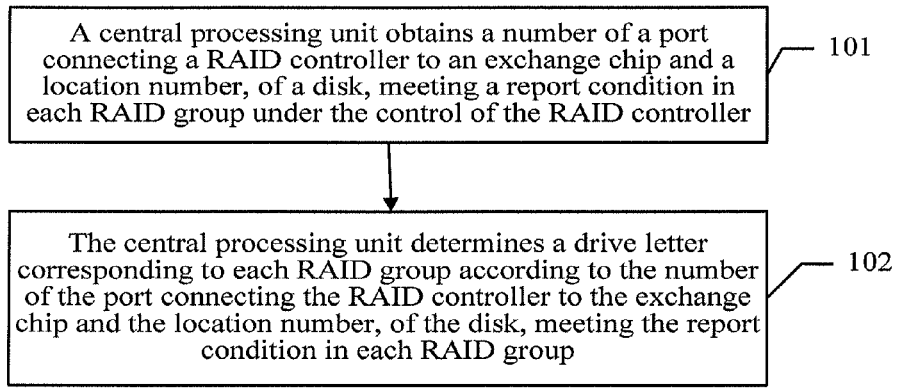
FIG. 1 is a schematic diagram of an embodiment of a method for determining a drive letter according to embodiments of the present disclosure.

Referring to FIG. 1, an embodiment of the method for determining a drive letter provided by the embodiments of the present disclosure includes the following steps:

101: A central processing unit obtains a number of a port connecting a RAID controller to an exchange chip and a location number, of a disk, meeting a report condition in each RAID group under the control of the RAID controller.

The redundant array of independent disk (RAID, Redundant array of Independent Disk) controller is an apparatus for data access management in physical and logical arrays, namely, an apparatus for managing a disk.

In the embodiment of the present disclosure, a connection relationship among the central processing unit, the exchange chip, the RAID controller, and the disk is as follows: the central processing unit is connected to the exchange chip, the exchange chip is connected to the RAID controller, and the RAID controller is connected to the disk; the exchange chip has at least one port, where each port of the exchange chip is connected to a RAID controller, and the port of the exchange chip may be an extended peripheral component interconnect express (PCI-E, Peripheral Component Interconnect Express) port; and each RAID controller has at least one port, each port of the RAID controller may be connected to a disk, and the port of the RAID controller may be a serial attached small computer system interface (SAS, Serial Attached Small Computer System) port or a serial advanced technology attachment (SATA, Serial Advanced Technology Attachment) port.

The location number of the disk is a number of a port connecting the disk to an apparatus which is connected to the disk. In the embodiment of the present disclosure, the location number of the disk is the number of the port connecting the disk to the RAID controller, and assuming that the number of the port connecting the disk to the RAID controller is a, the location number of the disk is a.

During system installation, after receiving a configuration request of a user, the central processing unit may configure a disk under the control of a RAID controller to a RAID group. Assuming that the RAID controller has 8 ports, which are a to h in sequence, and each port is connected to a disk, location numbers of disks are a to h respectively. The central processing unit may group the disks according to a RAID group configuration instruction carried in the configuration request of the user. The configuration instruction may be about which disks are configured to the same RAID group. For example, a, c, and e are configured to a RAID group; b, d, and f are configured to a RAID group; and g and h are configured to a RAID group.

The central processing unit may directly receive, from the RAID controller, the number of the port connecting the RAID controller to the exchange chip and the location number, of the disk, meeting the report condition in each RAID group under the control of the RAID controller. Alternatively, the central processing unit receives the number of the port connecting the RAID controller to the exchange chip and location numbers of all disks in each RAID group under the control of the RAID controller, where the number of the port and the location numbers of all disks are reported by the RAID controller; searches for location numbers of all disks included, when each RAID group is configured, in each RAID group according to the location numbers of all the disks in each RAID group, sorts the location numbers of all the disks included, when each RAID group is configured, in each RAID group according to a preset sequence, and selects a location number, of a disk, on a preset location after the sorting as the location number, of the disk, meeting the report condition in each RAID group.

The location number, of the disk, meeting the report condition may be: after determining the location numbers of all the disks included, when each RAID group is configured, in each RAID group during the system installation, the central processing unit or the RAID controller sorts the location numbers of all the disks included, when each RAID group is configured, in each RAID group according to the preset sequence, and selects the location number, of the disk, on the preset location after the sorting as the location number, of the disk, meeting the report condition in each RAID group.

The preset sequence may be: an ascending or a descending sequence, and may be other preset sequences. The preset location refers to a sequence location after the sorting, for example, a first location, a second location, . . . , or the last location.

Both the preset sequence and the preset location are set during the system installation, and every time a drive letter is determined, both the preset sequence and the preset location remain the same. Therefore, for the same RAID group, every time the drive letter is determined, location numbers of all disks included in the RAID group during the system installation are first determined, and then a location number, of a disk, meeting a report condition is selected by using the same preset sequence and preset location, thereby ensuring that the drive letter determined every time in the same RAID group is the same.

102: The central processing unit determines a drive letter corresponding to each RAID group according to the number of the port connecting the RAID controller to the exchange chip and the location number, of the disk, meeting the report condition in each RAID group.

The drive letter corresponding to each RAID group includes two arguments, and the determining a drive letter corresponding to each RAID group according to the number of the port connecting the RAID controller to the exchange chip and the location number, of the disk, meeting the report condition in each RAID group includes: using the number of the port connecting the RAID controller to the exchange chip as one argument in the drive letter corresponding to each RAID group, and using the location number, of the disk, meeting the report condition in each RAID group as the other argument in the drive letter corresponding to each RAID group.

The drive letter may be formed of two or more parameters, but no matter how many parameters the drive letter is formed of, the drive letter has two arguments, one of which is the number of the port connecting the RAID controller to the exchange chip, and the other of which is the location number, of the disk, meeting the report condition in the RAID group. When the drive letter of the RAID group is determined by using the two arguments, the front and back locations of the two arguments may not be limited. For example, the number of the port connecting the RAID controller to the exchange chip is 1, and the location number, of the disk, meeting the report condition in the RAID group is a, the drive letter corresponding to the RAID group may be in a form such as 1a, sd1a, a1, sda1, s1da, and sad1, where the sd is a fixed parameter, and is included in each drive letter, and has no specific meaning.

In the embodiment of the present disclosure, the number of the port connecting the redundant array of independent disk RAID controller to the exchange chip and the location number, of the disk, meeting the report condition in each RAID group under the control of the RAID controller are obtained, where the location number, of the disk, meeting the report condition is the location number, of the disk, on the preset location after the location numbers of all the disks included in each RAID group when each RAID group is configured, are sorted according to the preset sequence; and the drive letter corresponding to each RAID group is determined according to the number of the port connecting the RAID controller to the exchange chip and the location number, of the disk, meeting the report condition in each RAID group. Compared with the prior art where after the system is restarted or a disk is unplugged and plugged, the drive letter of each RAID group may be different, the solutions provided by the embodiment of the present disclosure may ensure that after every time the system is restarted or a disk is unplugged and plugged, the drive letter remains the same, so that the user can accurately find stored data.

In the embodiment corresponding to FIG. 1, when the central processing unit receives the number of the port connecting the RAID controller to the exchange chip and the location numbers of all the disks in each RAID group under the control of the RAID controller, the central processing unit needs to obtain the location number, of the disk, meeting the report condition in each RAID group, and the specific process of obtaining the location number, of the disk, meeting the report condition in each RAID group is exemplified as follows:

The number of the port connecting the RAID controller to the exchange chip received by the central processing unit is 1, and the received location numbers of all disks in 3 RAID groups under the control of the RAID controller are: a, c, and e; b, d, and f; and g and h, respectively; and when configuring each RAID group, the central processing unit stores configuration information of the location numbers of the disks included in each RAID group, and the configuration information may be denoted with Table 1 below:

TABLE 1

Table of Comparison between RAID Group and Location Numbers of Disks

| RAID group | Location number of disks |
|---|---|
| RAID | a, c, e |
| RAID | b, d, f |
| RAID | g, h |

Because the RAID group has no identifier, the central processing unit cannot distinguish each RAID group through a RAID group identifier. The central processing unit can only match the received location numbers of the disks in each RAID group with the location numbers of the disks stored when the central processing unit configures each RAID group, so as to determine a RAID group, in the configuration information, to which the location numbers of the disks belong.

Taking a match process of a RAID group where the received location numbers of all the included disks are a, c, and e, respectively, as an example, the match process in the embodiment of the present disclosure is described in detail: the location numbers a, c, and e of all the disks in the RAID group are matched with the configuration information in Table 1, and a RAID group where location numbers of the included disks are a, c, and e is found through matching in Table 1. Through matching, it is found that the received location numbers of all the disks in the RAID group are completely the same as the location numbers of all the disks stored when the RAID group is configured, indicating that no disk is unplugged or damaged in the RAID group, and the location number, of the disk, meeting the report condition in the RAID group may be selected from the location numbers, a, c, and e, of the disks according to the preset sequence and the preset location that are set during the system installation. Assuming that the preset sequence is ascending, and the preset location is the first location, the selection process is as follows: sorting the location numbers of the disks according to the ascending sequence, and selecting a location number a of a disk on the first location after the sorting as the location number, of the disk, meeting the report condition.

If the location numbers, received by the central processing unit, of all the disks included in the RAID group are c and e respectively, the location numbers c and e of all the disks in the RAID group are used to be matched with the configuration information in Table 1, and the RAID group where the location numbers of the included disks are a, c, and e are found through matching in Table 1. Through matching, it is found that the received location numbers of all the disks in the RAID group are not completely the same as the location numbers of all the disks stored when the RAID group is configured, indicating that a disk is unplugged or damaged in the RAID group, and the location number, of the disk, meeting the report condition in the RAID group can be selected from the location numbers, a, c, and e, of the disks in the configuration information according to the preset sequence and the preset location that are set during the system installation. Assuming that the preset sequence is ascending, and the preset location is the first location, the selection process is as follows: sorting the location numbers of the disks according to the ascending sequence, and selecting a location number a of a disk on the first location after the sorting as the location number, of the disk, meeting the report condition.

It may be known from the foregoing match process and exemplification, because the preset sequence and the preset location are set during the system installation, and remain the same every time the drive letter is determined, no matter whether the RAID group has a disk unplugged or damaged or not, the central processing unit can select the same location number of the disk, thereby ensuring that the determined drive letter remains the same.

Figure 2:
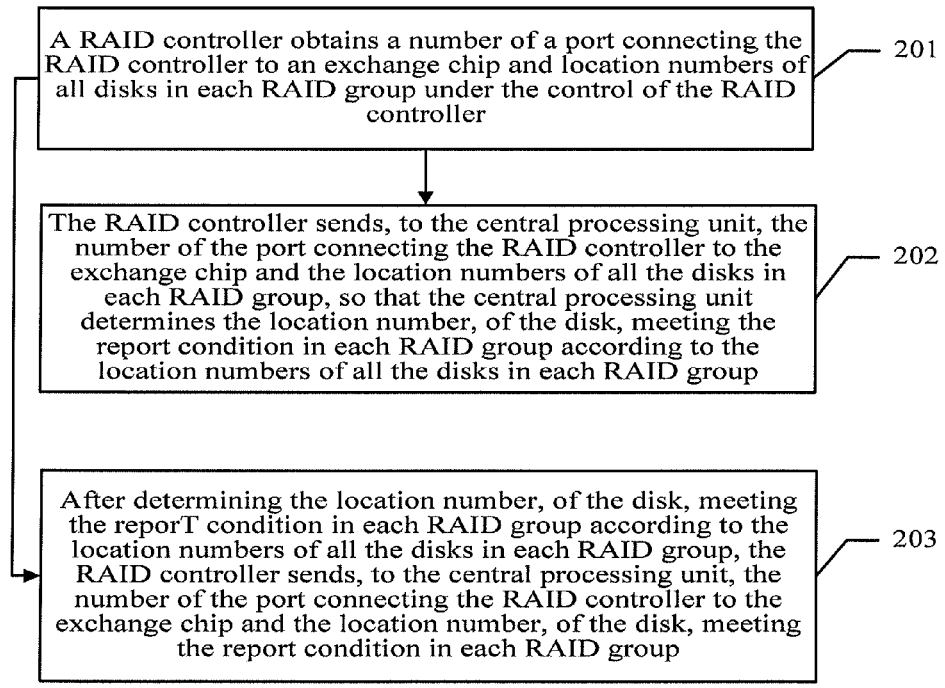
FIG. 2 is a schematic diagram of another embodiment of the method for determining a drive letter according to the embodiments of the present disclosure.

Referring to FIG. 2, another embodiment of the method for determining a drive letter according to the embodiments of the present disclosure includes the following steps:

201: A RAID controller obtains a number of a port connecting the RAID controller to an exchange chip and location numbers of all disks in each RAID group under the control of the RAID controller.

The number of the port connecting the RAID controller to the exchange chip is set in the RAID controller during system installation, and therefore the RAID controller only needs to read the number of the port connecting the RAID controller to the exchange chip.

The RAID controller may obtain a location number, of a disk, meeting a report condition in each RAID group and then send the location number to a central processing unit; and the RAID controller may also send the obtained location numbers of all the disks in each RAID group to the central processing unit, and then the central processing unit obtains the location number, of the disk, meeting the report condition in each RAID group according to the location numbers of all the disks in each RAID group.

When the RAID controller may obtain the location number, of the disk, meeting the report condition in each RAID group, step 203 is executed; otherwise, step 202 is executed.

202: The RAID controller sends, to the central processing unit, the number of the port connecting the RAID controller to the exchange chip and the location numbers of all the disks in each RAID group, so that the central processing unit determines the location number, of the disk, meeting the report condition in each RAID group according to the location numbers of all the disks in each RAID group.

The RAID controller sends, to the central processing unit, the number of the port connecting the RAID controller to the exchange chip and the location numbers of all the disks in each RAID group, so that the central processing unit determines the location numbers of all the disks included, during the system installation, in each RAID group according to the location numbers of all the disks in each RAID group, then sorts the location numbers of the disks in each RAID group according to a preset sequence, and selects a location number, of a disk, on a preset location after the sorting as the location number, of the disk, meeting the report condition, so that the central processing unit may determine a drive letter corresponding to each RAID group according to the number of the port connecting the RAID controller to the exchange chip and the location number, of the disk, meeting the report condition in each RAID group, where the location number, of the disk, meeting the report condition is the location number, of the disk, on the preset location after the location numbers of all the disks included in each RAID group when each RAID group is configured, are sorted according to the preset sequence.

203: After determining the location number, of the disk, meeting the report condition in each RAID group according to the location numbers of all the disks in each RAID group, the RAID controller sends, to the central processing unit, the number of the port connecting the RAID controller to the exchange chip and the location number, of the disk, meeting the report condition in each RAID group.

When the RAID controller has stored the configuration information in Table 1, the RAID controller may query for the location numbers of all the disks included, when each RAID group is configured, in each RAID group according to the location numbers of all the disks in each RAID group, sort the location numbers of all the disks included, when each RAID group is configured, in each RAID group according to the preset sequence, and select the location number, of the disk, on the preset location after the sorting as the location number, of the disk, meeting the report condition in each RAID group, so that the central processing unit may determine the drive letter corresponding to each RAID group according to the number of the port connecting the RAID controller to the exchange chip and the location number, of the disk, meeting the report condition in each RAID group, where the location number, of the disk, meeting the report condition is the location number, of the disk, on the preset location after location numbers of all disks included in each RAID group when each RAID group is configured, are sorted according to the preset sequence.

In the embodiment of the present disclosure, the redundant array of independent disk RAID controller obtains the number of the port connecting the RAID controller to the exchange chip and the location numbers of all the disks in each RAID group under the control of the RAID controller; the RAID controller determines the location number, of the disk, meeting the report condition in each RAID group according to the location numbers of all the disks in each RAID group; and the RAID controller sends, to the central processing unit, the number of the port connecting the RAID controller to the exchange chip and the location numbers of all the disks in each RAID group, so that the central processing unit determines the location number, of the disk, meeting the report condition in each RAID group according to the location numbers of all the disks in each RAID group; or sends, to the central processing unit, the number of the port connecting the RAID controller to the exchange chip and the location number, of the disk, meeting the report condition in each RAID group, so that the central processing unit determines the drive letter corresponding to each RAID group according to the number of the port connecting the RAID controller to the exchange chip and the location number, of the disk, meeting the report condition in each RAID group, where the location number, of the disk, meeting the report condition is the location number, of the disk, on the preset location after the location numbers of all the disks included in each RAID group when each RAID group is configured, are sorted according to the preset sequence. Compared with the prior art where after the system is restarted or a disk is unplugged and plugged, the drive letter of each RAID group may be different, the solutions provided by the embodiment of the present disclosure may ensure that after every time the system is restarted or a disk is unplugged and plugged, the drive letter remains the same, so that the user can accurately find stored data.

Based on the foregoing embodiment corresponding to FIG. 2, a first alternative embodiment may be as follows: the determining, by the RAID controller, the location number, of the disk, meeting the report condition in each RAID group according to the location numbers of all the disks in each RAID group includes: querying for the location numbers of all the disks included, when each RAID group is configured, in each RAID group according to the location numbers of all the disks in each RAID group, sorting the location numbers of all the disks included, when each RAID group is configured, in each RAID group according to the preset sequence, and selecting the location number, of the disk, on the preset location after the sorting as the location number, of the disk, meeting the report condition in each RAID group.

During the system installation, after the central processing unit receives a configuration request from a user, and groups disks into a RAID group according to a configuration instruction carried in the configuration request, the RAID controller may also store information of a disk included in each configured RAID group; at this time, the information of the disk in each RAID group is state information, and each disk is normal. This process may be understood with reference to the exemplification process of Table 1, and no matter whether a disk is unplugged or damaged or not, the same location number of the disk is selected as the location number, of the disk, meeting the report condition, and the location number, of the disk, meeting the report condition is sent to the central processing unit, thereby ensuring that the drive letter corresponding to each RAID group distributed by the central processing unit remains the same.

Based on the foregoing embodiment corresponding to FIG. 2, a second alternative embodiment may be as follows: in some systems, the configuration information stored in the RAID controller changes as a disk changes, and when the disk is unplugged or damaged, the RAID controller does not store a location number of the unplugged or damaged disk anymore, but the RAID controller stores information of the number of disks, during the system installation, in each RAID group all the time. In this case, after the RAID controller queries for the location numbers of all the disks in each RAID group, the RAID controller further queries, according to the location numbers of all the disks in each RAID group, for the number of the disks included when each RAID group is configured; and moreover, when the number of the disks included in each RAID group is different from the number of the disks included when each RAID group is configured, the RAID controller sends, to the central processing unit, the number of the port connecting the RAID controller to the exchange chip and the location numbers of all the disks in each RAID group, so that the central processing unit may determine the location numbers of all the disks included, during the system installation, in each RAID group according to the location numbers of all the disks in each RAID group, then sort the location numbers of the disks in each RAID group according to the preset sequence, and select the location number, of the disk, on the preset location after the sorting as the location number, of the disk, meeting the report condition.

For ease of understanding, the second alternative embodiment based on FIG. 2 is exemplified in the following. The RAID controller does not store the configuration information when the RAID group is configured, but stores information of the number of disks included, when each RAID group is configured, in the RAID group every time the system is started, and no matter whether a disk is unplugged or damaged or not, the number does not change, but when a disk is unplugged or damaged, the location number of the unplugged or damaged disk is not stored anymore. For example, if when being configured, the RAID group includes 3 disks a, c, and e, the RAID controller stores the information of the number of the three disks all the time, and when a disk with the location number a is unplugged, the RAID controller only stores location numbers of the two disks: c and e, but still stores information that when the RAID group is configured, 3 disks exist when the RAID group is configured, and this process may be understood with reference to Table 2:

TABLE 2

Table of Information Stored When System is Started

| The number of disks included when RAID group is configured | Location numbers of disks in RAID group when a system is started |
|---|---|
| 3 | c, e |
| 3 | d, f |
| 2 | h |

When location numbers, found by the RAID controller, of all disks included in a RAID group are c and e, respectively, it may be learned from Table 2 according to the location numbers, c and e, of all the disks in the RAID group that 3 disks are included when the RAID group is configured, indicating that a disk is unplugged or damaged. In this way, the RAID controller cannot accurately find the location number, of the disk, meeting the report condition, and therefore sends the location numbers of all the disks in each RAID group to the central processing unit, and the central processing unit sorts the location numbers of all the disks included, when the RAID group is configured, in the RAID group according to the alternative solution corresponding to FIG. 1 and according to the preset sequence, and then selects the location number, of the disk, on the preset location as the location number, of the disk, meeting the report condition, so as to determine the drive letter corresponding to the RAID group, thereby ensuring that the drive letter corresponding to each RAID group remains the same.

When the number of all the disks in each RAID group is the same as the number of the disks included when each RAID group is configured, the RAID controller may determine the location number, of the disk, meeting the report condition, and the central processing unit may also select the location number, of the disk, meeting the report condition according to the processing solution where the number of all the disks in each RAID group is different from the number of the disks included when each RAID group is configured.

Figure 3:
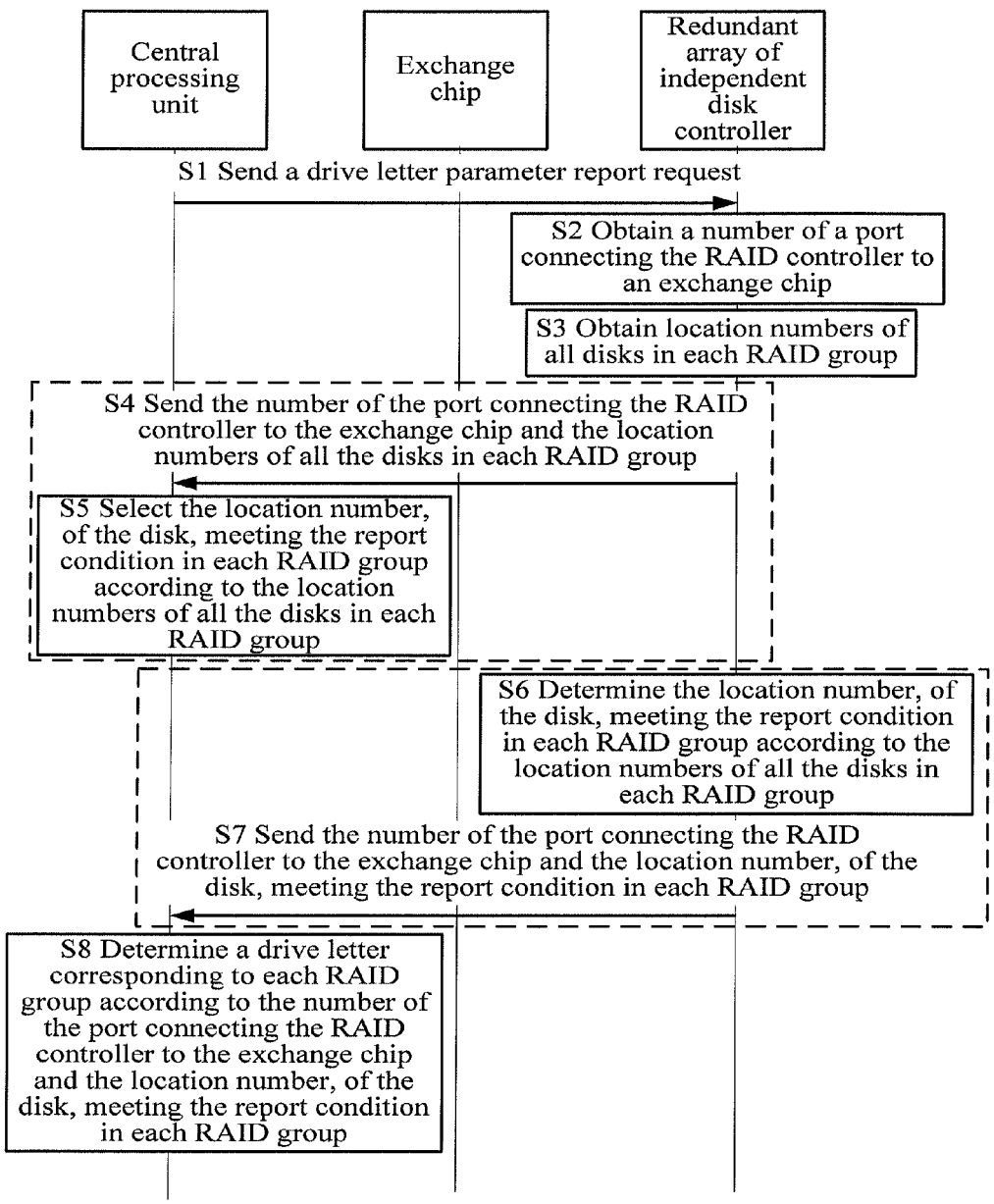
FIG. 3 is a schematic diagram of an application scenario of the method for determining a drive letter according to the embodiments of the present disclosure.

For ease of understanding, the following describes the specific process of the embodiment of the present disclosure in detail by taking a specific application scenario as an example:

Referring to FIG. 3, an embodiment of an application scenario provided by the embodiments of the present disclosure includes:

S1: A central processing unit sends a drive letter parameter report request to a redundant array of independent disk RAID controller.

S2: After receiving the drive letter parameter report request sent by the central processing unit, the RAID controller obtains a number of a port connecting the RAID controller to an exchange chip.

The RAID controller is connected to a PCIE port of the exchange chip, and after receiving the drive letter parameter report request, the RAID controller may obtain the number of the port connecting the RAID controller to the exchange chip by querying for the number of the port connecting the RAID controller to the exchange chip.

S3: The RAID controller obtains location numbers of all disks in each RAID group under the control of the RAID controller.

After the location numbers of all the disks in each RAID group are obtained, steps S4 and S5 may be executed, steps S6 and S7 may also be executed, the number of the port connecting the RAID controller to the exchange chip and a location number, of a disk, meeting a report condition in each RAID group are finally obtained, and a drive letter corresponding to each RAID group is determined in step S8.

S4: The RAID controller sends, to the central processing unit, the number of the port connecting the RAID controller to the exchange chip and the location numbers of all the disks in each RAID group.

S5: The central processing unit searches for location numbers of all disks included, when each RAID group is configured, in each RAID group according to the location numbers of all the disks in each RAID group, sorts the location numbers of all the disks included, when each RAID group is configured, in each RAID group according to a preset sequence, and selects a location number, of a disk, on a preset location after the sorting as the location number, of the disk, meeting the report condition in each RAID group.

The location number, of the disk, meeting the report condition may be: after determining the location numbers of all the disks included, when each RAID group is configured during the system installation, in each RAID group, the central processing unit or the RAID controller sorts the location numbers of all the disks included, when each RAID group is configured, in each RAID group according to the preset sequence, and selects the location number, of the disk, on the preset location after the sorting as the location number, of the disk, meeting the report condition in each RAID group.

The preset sequence may be: an ascending or a descending sequence, and may be other preset sequences. The preset location refers to a sequence location after the sorting, for example, a first location, a second location, . . . , or the last location.

Both the preset sequence and the preset location are set during the system installation, and every time a drive letter is determined, both the preset sequence and the preset location remain the same. Therefore, for the same RAID group, every time the drive letter is determined, location numbers of all disks included in the RAID group during the system installation are first determined, and then a location number, of a disk, meeting a report condition is selected by using the same preset sequence and preset location, thereby ensuring that the drive letter determined every time in the same RAID group is the same.

S6: The RAID controller determines the location number, of the disk, meeting the report condition in each RAID group according to the location numbers of all the disks in each RAID group.

A location number, stored when the RAID group is configured, of each disk is found according to the location numbers of all the disks in each RAID group.

The location number, of the disk, meeting the report condition is selected according to a preset rule from the location number, stored when the RAID group is configured, of each disk.

S7: The RAID controller sends, to the central processing unit, the number of the port connecting the RAID controller to the exchange chip and the location number, of the disk, meeting the report condition in each RAID group.

S8: The central processing unit determines a drive letter corresponding to each RAID group according to the number of the port connecting the RAID controller to the exchange chip and the location number, of the disk, meeting the report condition in each RAID group.

The central processing unit uses the number of the port connecting the RAID controller to the exchange chip as one argument in the drive letter corresponding to each RAID group, and uses the location number, of the disk, meeting the report condition in each RAID group as the other argument in the drive letter corresponding to each RAID group.

Figure 4:
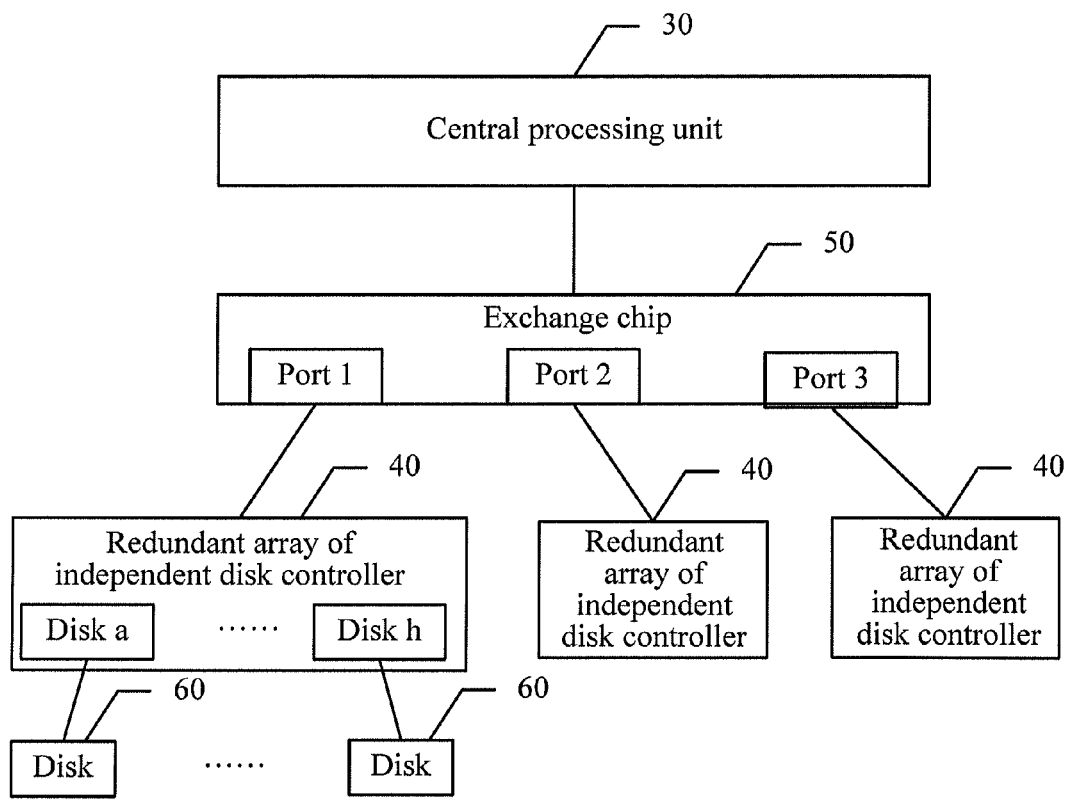
FIG. 4 is a schematic diagram of another application scenario of the method for determining a drive letter according to the embodiments of the present disclosure.

Referring to FIG. 4, this application scenario further provides an embodiment, where a central processing unit 30 controls an exchange chip 50. The exchange chip 50 in this embodiment is a PCIE (PCI-Express) exchange chip, the exchange chip 50 has 3 ports, whose port numbers are port 1, port 2, and port 3, respectively; and each port is connected to a redundant array of independent disk RAID controller 40. Taking a RAID controller 40 on the left side as an example, the RAID controller 40 has 8 ports, whose port number are a to h in sequence. During system installation, after receiving a configuration request, the central processing unit groups the disks according to a configuration instruction carried in the configuration request. The configuration instruction may be about which disks are configured to the same RAID group. For example, a, c, and e are configured to a RAID group; b, d, and f are configured to a RAID group; and g and h are configured to a RAID group. The RAID controller stores information of correspondence between the RAID group in a configuration state and location numbers of disks 60, and configuration information may be understood with reference to Table 1.

After the RAID controller 40 receives a drive letter parameter report request sent by the central processing unit 30, the RAID controller 40 obtains that a number of a port connecting the RAID controller 40 to the exchange chip is 1, and then queries the RAID group under control for a location number of each disk. When querying a RAID group, the RAID controller 40 finds 3 disks, whose location numbers are a, c, and e, respectively. If the RAID controller 40 determines that the location numbers a, c, and e are completely the same as the location numbers, stored in Table 1, corresponding to the RAID group after comparison, the RAID controller 40 directly sorts the found a, c, and e according to a preset sequence from the found RAID group including the a, c, and e, and selects a location number, of a disk, on a preset location after the sorting as the location number, of the disk, meeting the report condition. Assuming that in this embodiment, a location number of a disk on a first location is reported after the sorting is performed according to an ascending sequence, the selected location number, of the disk, meeting the report condition is a. When querying the RAID group likewise, the RAID controller 40 only finds 2 disks, whose location numbers are c and e respectively. If the RAID controller 40 determines that the location numbers c and e are not completely the same as the location numbers, stored in Table 1, corresponding to the RAID group including the c and e after comparison and a disk with the location number a is further included, the RAID controller 40 sorts the a, c, and e from the configuration information in Table 1 according to a preset sequence and selects a location number, of a disk, on a preset location after the sorting as the location number, of the disk, meeting the report condition. When the preset sequence is an ascending sequence and the preset location is a first location after the sorting, the location number meeting the condition is still a. It can be seen from this that, no matter which solution is selected, 1 and a are selected finally. The RAID controller reports, to the central processing unit, the number 1 of the port connecting the RAID controller to the exchange chip and the location number a of the disk meeting the report condition; and the central processing unit determines the drive letter according to the preset rule and according to 1 and a; if the preset rule designates that the number of the port connecting the RAID controller to the exchange chip is ahead, the determined drive letter is 1a; if the preset rule presets that a location number of a disk with the minimum location number is ahead, the determined drive letter is a1. Only variables are written out here, and the drive letter may actually be in other forms such as sd1a and sda1, where the sd is fixed, is included in each drive letter, and has no specific meaning.

Assuming that it is designated that the number of the port connecting the RAID controller to the exchange chip is ahead, a drive letter corresponding to the RAID group including the a, c, and e is determined to be sd1a, and in the same way, a drive letter corresponding to a RAID group including b, d, and f is determined to be sd1b, and a drive letter corresponding to a RAID group including g and h is determined to be sd1g. Assuming that a RAID group corresponding to the drive letter sd1a stores a file A, a RAID group corresponding to the drive letter sd1b stores a file B, and a RAID group corresponding to the drive letter sd1g stores a file C; in this way, after the system is restarted or a disk is unplugged and plugged, the drive letter of each RAID group does not change, and the user may accurately find data to be sought.

Figure 5:
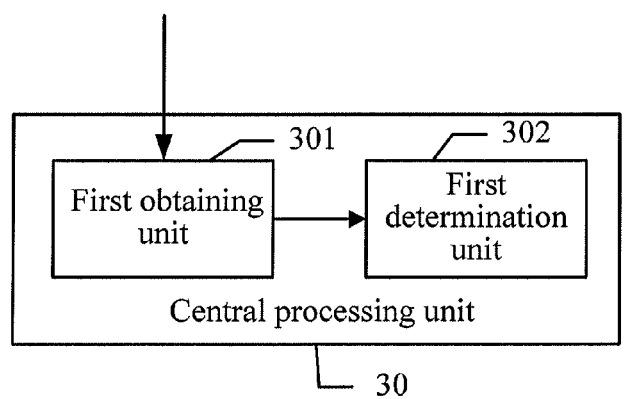
FIG. 5 is a schematic diagram of an embodiment of a central processing unit according to the embodiments of the present disclosure.

Referring to FIG. 5, an embodiment of a central processing unit provided by the embodiments of the present disclosure includes:

a first obtaining unit 301, configured to obtain a number of a port connecting a RAID controller to an exchange chip and a location number, of a disk, meeting a report condition in each RAID group under the control of the RAID controller, where the location number, of the disk, meeting the report condition is a location number, of a disk, on a preset location after location numbers of all disks included in each RAID group when each RAID group is configured, are sorted according to a preset sequence; and a first determination unit 302, configured to determine a drive letter corresponding to each RAID group according to the number of the port connecting the RAID controller to the exchange chip and the location number, of the disk, meeting the report condition in each RAID group, where the number of the port and the location number of the disk are obtained by the first obtaining unit 301.

In the embodiment of the present disclosure, the first obtaining unit 301 obtains the number of the port connecting the redundant array of independent disk RAID controller to the exchange chip and the location number, of the disk, meeting the report condition in each RAID group under the control of the RAID controller, where the location number, of the disk, meeting the report condition is the location number, of the disk, on the preset location after the location numbers of all the disks included in each RAID group when each RAID group is configured, are sorted according to the preset sequence; and the first determination unit 302 determines the drive letter corresponding to each RAID group according to the number of the port connecting the RAID controller to the exchange chip and the location number, of the disk, meeting the report condition in each RAID group, where the number of the port and the location number of the disk are obtained by the first obtaining unit 301. Compared with the prior art, the central processing unit provided by the embodiment of the present disclosure may ensure that, after every time a system is restarted or a disk is unplugged and plugged, the determined drive letter remains the same, so that a user can accurately find stored data.

Figure 6:
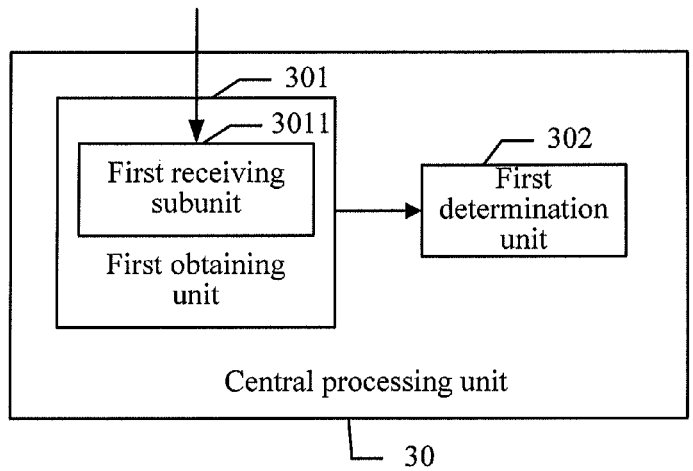
FIG. 6 is a schematic diagram of an embodiment of the central processing unit according to the embodiments of the present disclosure.

Based on the foregoing embodiment corresponding to FIG. 5, and referring to FIG. 6, in another embodiment of the central processing unit provided by the embodiments of the present disclosure, the first obtaining unit 301 includes:

a first receiving subunit 3011, configured to receive the number of the port connecting the RAID controller to the exchange chip and the location number, of the disk, meeting the report condition in each RAID group under the control of the RAID controller, where the number of the port and the location number of the disk are reported by the RAID controller.

Figure 7:
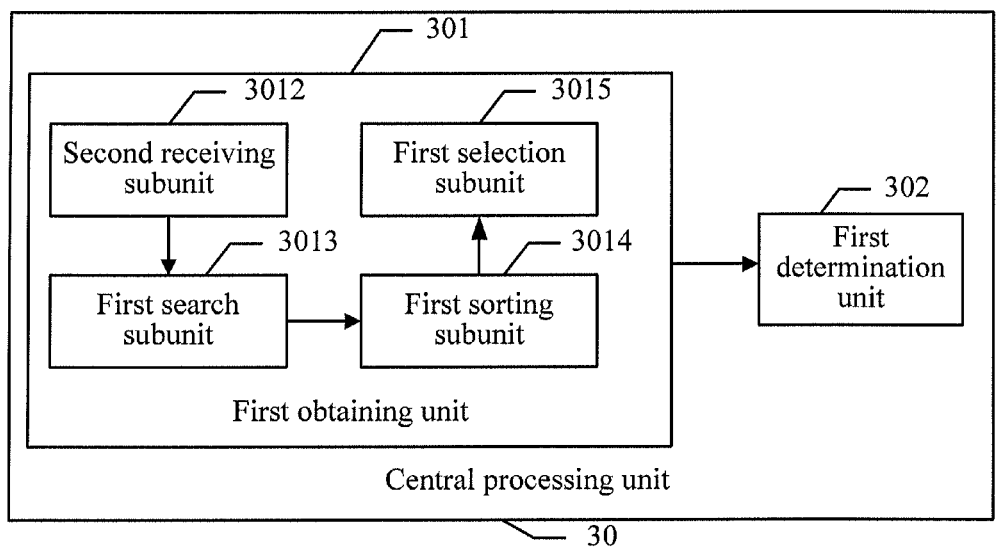
FIG. 7 is a schematic diagram of an embodiment of the central processing unit according to the embodiments of the present disclosure.

Based on the foregoing embodiment corresponding to FIG. 5, and referring to FIG. 7, in another embodiment of the central processing unit provided by the embodiments of the present disclosure, the first obtaining unit 301 includes:

a second receiving subunit 3012, configured to receive the number of the port connecting the RAID controller to the exchange chip and location numbers of all disks in each RAID group under the control of the RAID controller, where the number of the port and the location numbers of all disks are reported by the RAID controller;

a first search subunit 3013, configured to search for location numbers of all disks included, when each RAID group is configured, in each RAID group according to the location numbers of all the disks in each RAID group received by the second receiving subunit 3012;

a first sorting subunit 3014, configured to sort, according to the preset sequence, the location numbers of all the disks included, when each RAID group is configured, in each RAID group found by the first search subunit 3013; and a first selection subunit 3015, configured to select the location number, of the disk, on the preset location after the sorting of the first sorting subunit 3014 as the location number, of the disk, meeting the report condition in each RAID group.

Based on the foregoing embodiments corresponding to FIG. 5 to FIG. 7, in another embodiment of the central processing unit provided by the embodiments of the present disclosure:

the first determination unit 302 is configured to use the number of the port connecting the RAID controller to the exchange chip as one argument in the drive letter corresponding to each RAID group, and use the location number, of the disk, meeting the report condition in each RAID group as the other argument in the drive letter corresponding to each RAID group.

Figure 8:
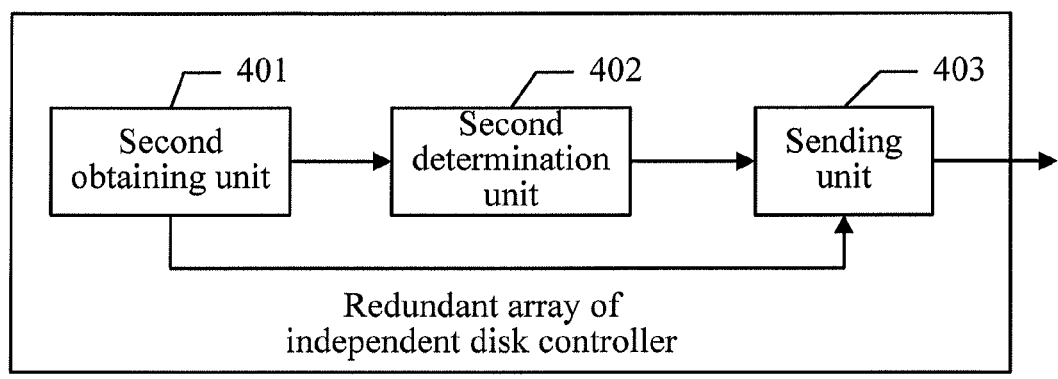
FIG. 8 is a schematic diagram of an embodiment of a RAID controller according to the embodiments of the present disclosure.

Referring to FIG. 8, an embodiment of a redundant array of independent disk controller provided by the embodiments of the present disclosure includes:

a second obtaining unit 401, configured to obtain a number of a port connecting the RAID controller to an exchange chip and location numbers of all disks in each RAID group under the control of the RAID controller;

a second determination unit 402, configured to determine a location number, of a disk, meeting a report condition in each RAID group according to the location numbers of all the disks in each RAID group obtained by the second obtaining unit 401; and a sending unit 403, configured to send, to a central processing unit, the number of the port connecting the RAID controller to the exchange chip and the location numbers of all the disks in each RAID group under the control of the RAID controller, where the number of the port and the location number of the disk are obtained by the second obtaining unit 401, so that the central processing unit determines the location number, of the disk, meeting the report condition in each RAID group according to the location numbers of all the disks in each RAID group; or send, to the central processing unit, the number of the port connecting the RAID controller to the exchange chip obtained by the second obtaining unit 401 and the location number, of the disk, meeting the report condition in each RAID group determined by the second determination unit 402, so that the central processing unit determines a drive letter corresponding to each RAID group according to the number of the port connecting the RAID controller to the exchange chip and the location number, of the disk, meeting the report condition in each RAID group, where the location number, of the disk, meeting the report condition is a location number, of a disk, on a preset location after location numbers of all disks included in each RAID group when each RAID group is configured, are sorted according to a preset sequence.

In the embodiment of the present disclosure, the second obtaining unit 401 obtains the number of the port connecting the RAID controller to the exchange chip and the location numbers of all the disks in each RAID group under the control of the RAID controller; the second determination unit 402 determines the location number, of the disk, meeting the report condition in each RAID group according to the location numbers of all the disks in each RAID group obtained by the second obtaining unit 401; and the sending unit 403 sends, to the central processing unit, the number of the port connecting the RAID controller to the exchange chip and the location numbers of all the disks in each RAID group under the control of the RAID controller, where the number of the port and the location number of the disk are obtained by the second obtaining unit 401, so that the central processing unit determines the location number, of the disk, meeting the report condition in each RAID group according to the location numbers of all the disks in each RAID group; or sends, to the central processing unit, the number of the port connecting the RAID controller to the exchange chip obtained by the second obtaining unit 401 and the location number, of the disk, meeting the report condition in each RAID group determined by the second determination unit 402, so that the central processing unit determines the drive letter corresponding to each RAID group according to the number of the port connecting the RAID controller to the exchange chip and the location number, of the disk, meeting the report condition in each RAID group, where the location number, of the disk, meeting the report condition is the location number, of the disk, on the preset location after the location numbers of all the disks included, when each RAID group is configured, in each RAID group are sorted according to the preset sequence. Compared with the prior art, the RAID controller provided by the embodiment of the present disclosure may ensure that, after every time a system is restarted or a disk is unplugged and plugged, the drive letter determined by the central processing unit remains the same, so that a user can accurately find stored data.

Figure 9:
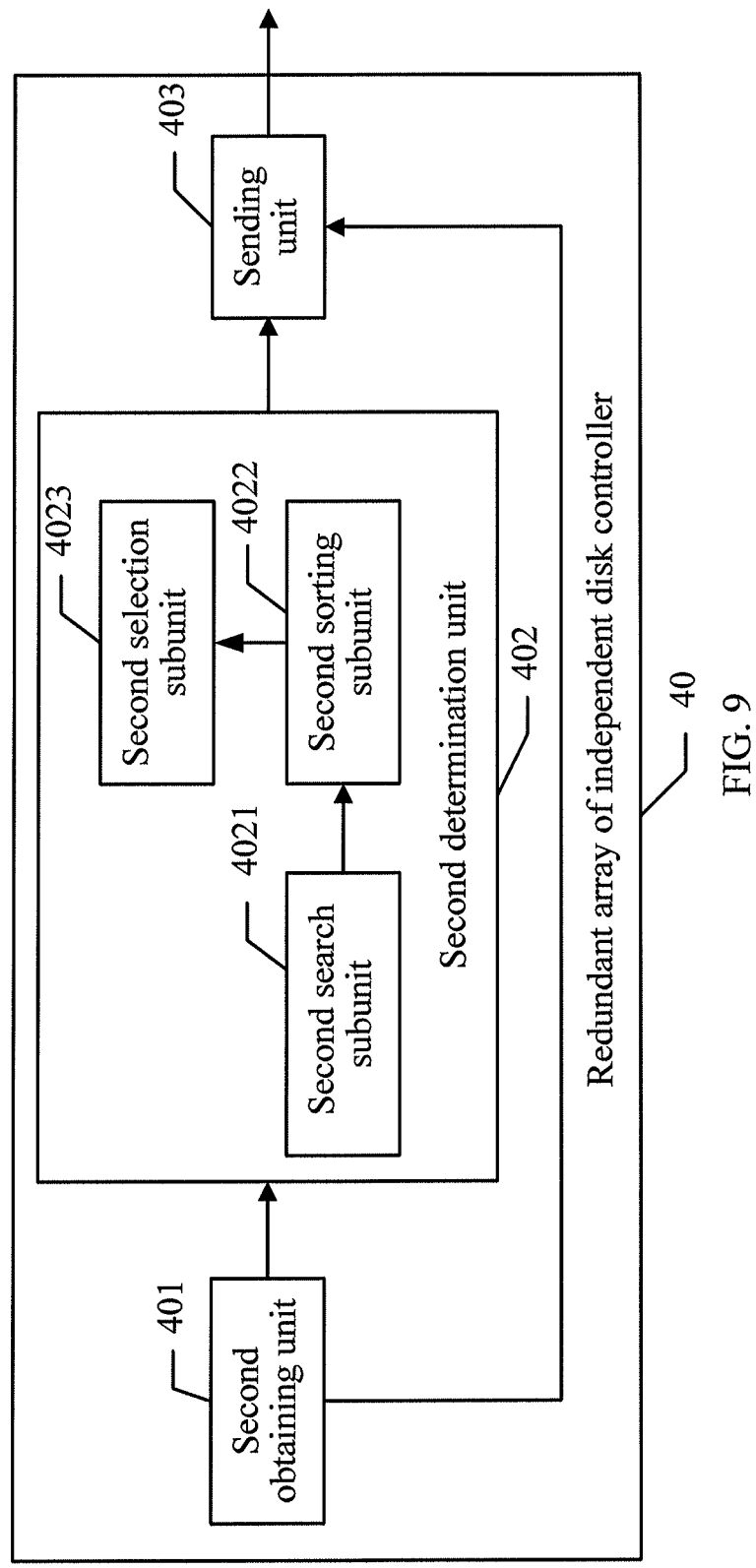
FIG. 9 is a schematic diagram of another embodiment of the RAID controller according to the embodiments of the present disclosure.

Based on the foregoing embodiment corresponding to FIG. 8, and referring to FIG. 9, in another embodiment of the redundant array of independent disk controller provided by the embodiments of the present disclosure, the second determination unit 402 includes:

a second search subunit 4021, configured to search for the location numbers of all the disks included, when each RAID group is configured, in each RAID group according to the location numbers of all the disks in each RAID group; and a second sorting subunit 4022, configured to sort, according to the preset sequence, the location numbers of all the disks included, when each RAID group is configured, in each RAID group found by the second search subunit 4021; and a second selection subunit 4023, configured to select the location number, of the disk, on the preset location after the sorting of the second sorting subunit 4022 as the location number, of the disk, meeting the report condition in each RAID group.

Figure 10:
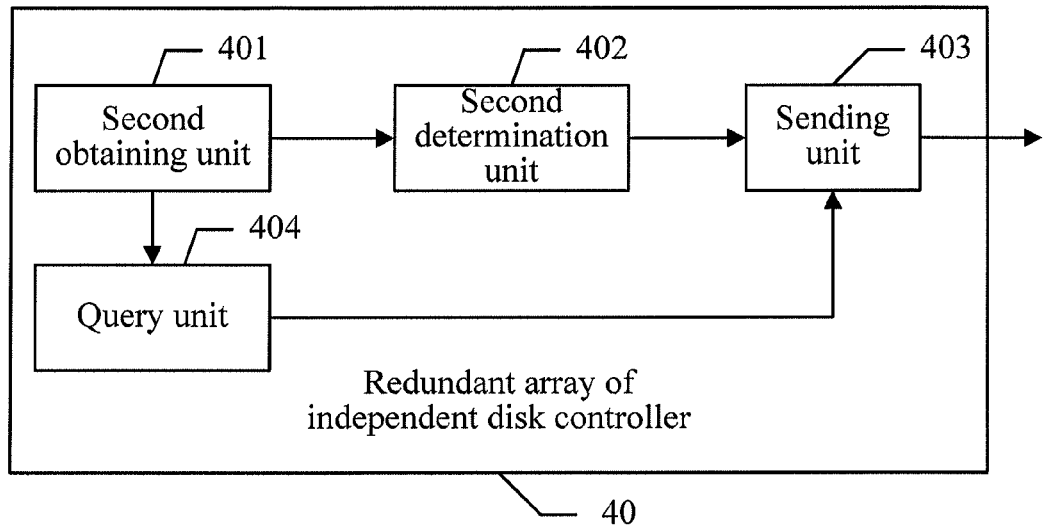
FIG. 10 is a schematic diagram of another embodiment of the RAID controller according to the embodiments of the present disclosure.

Based on the foregoing embodiment corresponding to FIG. 8, and referring to FIG. 10, another embodiment of the redundant array of independent disk controller provided by the embodiments of the present disclosure further includes:

a query unit 404, configured to query for the number of the disks included, when each RAID group is configured, in each RAID group according to the location numbers of all the disks in each RAID group; and the sending unit 403 is configured to send, to the central processing unit, the number of the port connecting the RAID controller to the exchange chip and the location numbers of all the disks in each RAID group when the number of the disks included in each RAID group found by the query unit 404 is different from the number of the disks included when each RAID group is configured.

The solutions provided by the embodiment of the present disclosure may ensure that when a disk is unplugged or the disk is damaged, the drive letter can still remain the same.

The embodiments of the present disclosure further provide a computer storage medium, where the computer storage medium may store a program, and when being executed, the program includes a part or all of steps of the data processing method recorded in the method embodiments where the foregoing central processing unit acts as an executive body.

The embodiments of the present disclosure further provide a computer storage medium, where the computer storage medium may store a program, and when being executed, the program includes a part or all of steps of the data processing method recorded in the method embodiments where the foregoing RAID controller acts as an executive body.

Figure 11:
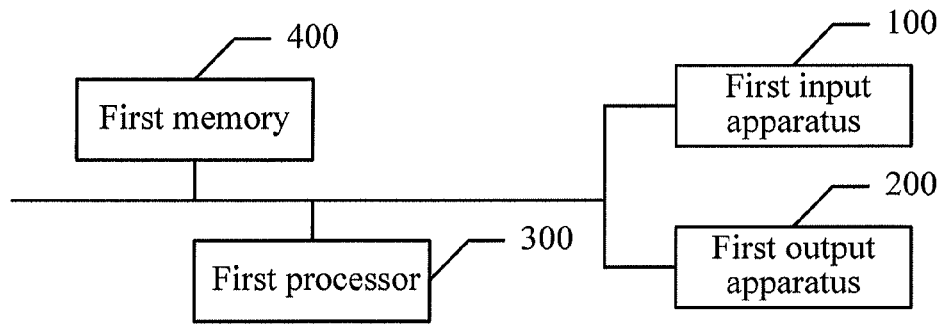
FIG. 11 is a schematic diagram of an embodiment of a device for determining a drive letter according to the embodiments of the present disclosure.

Referring to FIG. 11, an embodiment of a device for determining a drive letter provided by the embodiments of the present disclosure includes: a first input apparatus 100, a first output apparatus 200, a first processor 300, and a first memory 400, where the first input apparatus 100, the first output apparatus 200, the first processor 300, and the first memory 400 may be connected through a bus or in other manners;

the first input apparatus 100 transmits received data to the first memory 400, the first processor 300 processes the data stored in the first memory 400, and the first output apparatus 200 outputs the data processed by the first processor 300; and the first processor 300 executes the following steps:

obtaining a number of a port connecting a redundant array of independent disk RAID controller to an exchange chip and a location number, of a disk, meeting a report condition in each RAID group under the control of the RAID controller, where the location number, of the disk, meeting the report condition is a location number, of a disk, on a preset location after location numbers of all disks included in each RAID group when each RAID group is configured, are sorted according to a preset sequence; and determining a drive letter corresponding to each RAID group according to the number of the port connecting the RAID controller to the exchange chip and the location number, of the disk, meeting the report condition in each RAID group.

In another embodiment of the device for determining a drive letter provided by the present disclosure, the first processor 300 receives the number of the port connecting the RAID controller to the exchange chip and the location number, of the disk, meeting the report condition in each RAID group under the control of the RAID controller, where the number of the port and the location number of the disk are reported by the RAID controller.

In another embodiment of the device for determining a drive letter provided by the present disclosure, the first processor 300 receives the number of the port connecting the RAID controller to the exchange chip and location numbers of all disks in each RAID group under the control of the RAID controller, where the number of the port and the location numbers of all disks are reported by the RAID controller; searches for the location numbers of all the disks included, when each RAID group is configured, in each RAID group according to the location numbers of all the disks in each RAID group, sorts the location numbers of all the disks included, when each RAID group is configured, in each RAID group according to the preset sequence, and selects the location number, of the disk, on the preset location after the sorting as the location number, of the disk, meeting the report condition in each RAID group.

In another embodiment of the device for determining a drive letter provided by the present disclosure, the drive letter corresponding to each RAID group includes two arguments, and the first processor 300 uses the number of the port connecting the RAID controller to the exchange chip as one argument in the drive letter corresponding to each RAID group, and uses the location number, of the disk, meeting the report condition in each RAID group as the other argument in the drive letter corresponding to each RAID group.

Figure 12:
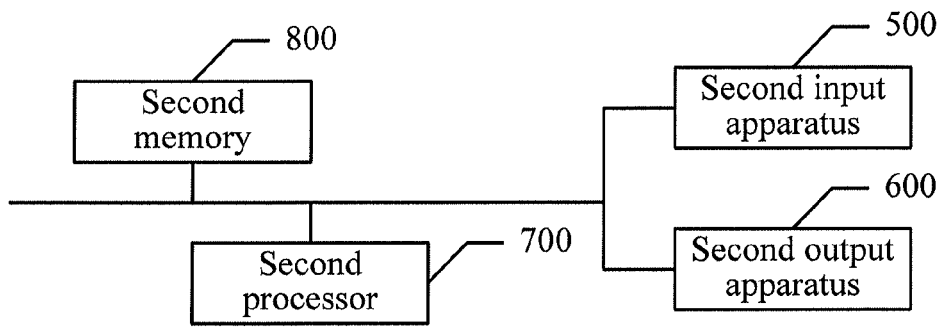
FIG. 12 is a schematic diagram of an embodiment of the device for determining a drive letter according to the embodiments of the present disclosure.

Referring to FIG. 12, an embodiment of the device for determining a drive letter provided by the embodiments of the present disclosure includes: a second input apparatus 500, a second output apparatus 600, a second processor 700, and a second memory 800, where the second input apparatus 500, the second output apparatus 600, the second processor 700, and the second memory 800 may be connected through a bus or in other manners;

the second input apparatus 500 transmits received data to the second memory 800, the second processor 700 processes the data stored in the second memory 800, and the second output apparatus 600 outputs the data processed by the second processor 700; and the second processor 700 executes the following steps:

obtaining a number of a port connecting a RAID controller to an exchange chip and location numbers of all disks in each RAID group under the control of the RAID controller;

determining a location number, of a disk, meeting a report condition in each RAID group according to the location numbers of all the disks in each RAID group; and sending, to a central processing unit, the number of the port connecting the RAID controller to the exchange chip and the location numbers of all the disks in each RAID group, so that the central processing unit determines the location number, of the disk, meeting the report condition in each RAID group according to the location numbers of all the disks in each RAID group; or sending, to the central processing unit, the number of the port connecting the RAID controller to the exchange chip and the location number, of the disk, meeting the report condition in each RAID group, so that the central processing unit determines a drive letter corresponding to each RAID group according to the number of the port connecting the RAID controller to the exchange chip and the location number, of the disk, meeting the report condition in each RAID group, where the location number, of the disk, meeting the report condition is a location number, of a disk, on a preset location after location numbers of all disks included in each RAID group when each RAID group is configured, are sorted according to a preset sequence.

In another embodiment of the device for determining a drive letter provided by the present disclosure, the second processor 700 searches for the location numbers of all the disks included, when each RAID group is configured, in each RAID group according to the location numbers of all the disks in each RAID group, sorts the location numbers of all the disks included, when each RAID group is configured, in each RAID group according to the preset sequence, and selects the location number, of the disk, on the preset location after the sorting as the location number, of the disk, meeting the report condition in each RAID group.

In another embodiment of the device for determining a drive letter provided by the present disclosure, the second processor 700 queries for the number of the disks included, when each RAID group is configured, in each RAID group according to the location numbers of all the disks in each RAID group; and when the number of the disks included in each RAID group is different from the number of the disks included when each RAID group is configured, the second processor 700 sends, to the central processing unit, the number of the port connecting the RAID controller to the exchange chip and the location numbers of all the disks in each RAID group.

Figure 13:
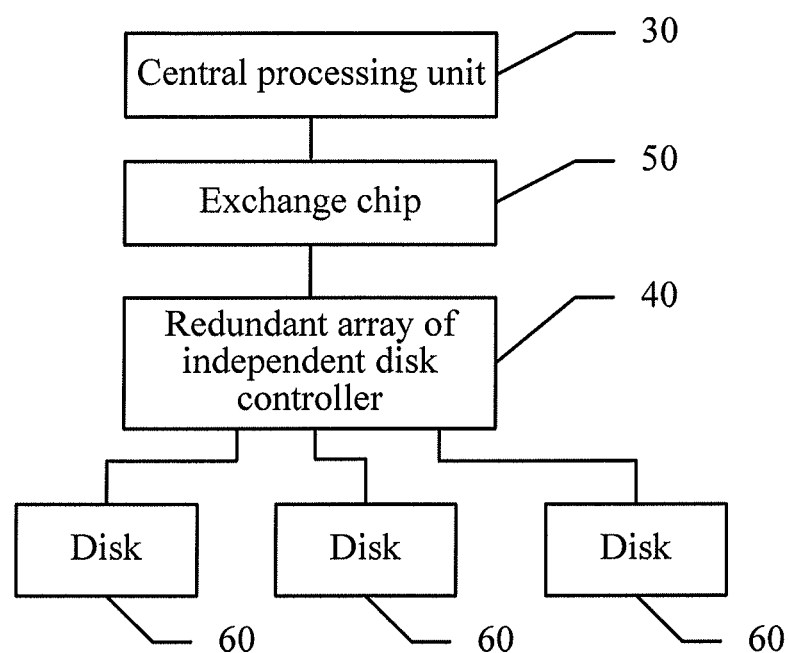
FIG. 13 is a schematic diagram of an embodiment of a system according to the embodiments of the present disclosure.

Referring to FIG. 13, an embodiment of a system for determining a drive letter provided by the embodiments of the present disclosure includes: a central processing unit 30, an exchange chip 50, a redundant array of independent disk controller 40, and disks 60, where the central processing unit 30, the exchange chip 50, the redundant array of independent disk controller 40, and the disks 60 are connected through a bus or in other manners;

the central processing unit 30 is configured to obtain a number of a port connecting the redundant array of independent disk RAID controller to the exchange chip and a location number, of a disk, meeting a report condition in each RAID group under the control of the RAID controller, where the location number, of the disk, meeting the report condition is a location number, of a disk, on a preset location after location numbers of all disks included in each RAID group when each RAID group is configured, are sorted according to a preset sequence; and determine a drive letter corresponding to each RAID group according to the number of the port connecting the RAID controller to the exchange chip and the location number, of the disk, meeting the report condition in each RAID group; and the redundant array of independent disk controller 40 is configured to obtain the number of the port connecting the RAID controller to the exchange chip and location numbers of all disks in each RAID group under the control of the RAID controller; the RAID controller determines the location number, of the disk, meeting the report condition in each RAID group according to the location numbers of all the disks in each RAID group; the RAID controller sends, to the central processing unit, the number of the port connecting the RAID controller to the exchange chip and the location numbers of all the disks in each RAID group, so that the central processing unit determines the location number, of the disk, meeting the report condition in each RAID group according to the location numbers of all the disks in each RAID group; or sends, to the central processing unit, the number of the port connecting the RAID controller to the exchange chip and the location number, of the disk, meeting the report condition in each RAID group, so that the central processing unit determines the drive letter corresponding to each RAID group according to the number of the port connecting the RAID controller to the exchange chip and the location number, of the disk, meeting the report condition in each RAID group, where the location number, of the disk, meeting the report condition is the location number, of the disk, on the preset location after the location numbers of all the disks included, when each RAID group is configured, in each RAID group are sorted according to the preset sequence.

The system provided by the embodiment of the present disclosure may ensure that, after every time a system is restarted or a disk is unplugged and plugged, the drive letter determined by the central processing unit remains the same, so that a user can accurately find stored data.

A person of ordinary skill in the art may understand that all or part of the steps of the methods in the foregoing embodiments may be implemented by a computer program instructing relevant hardware such as a hardware processor. The program may be stored in a computer readable storage medium accessible to the hardware processor. The storage medium may include a ROM, a RAM, a magnetic disk, or an optical disk.

The method, apparatus, and system for determining a drive letter provided by the embodiments of the present disclosure are introduced in detail above. Specific cases are used for illustrating principles and implementation manners of the present disclosure. The above descriptions of the embodiments are merely for understanding the method and core ideas of the present disclosure. Meanwhile, a person of ordinary skill in the art may make modifications to the specific implementation manners and application ranges according to the idea of the present disclosure. In conclusion, the content of the specification shall not be regarded as a limitation to the present disclosure.

What is claimed is:

1. A method for providing information of a drive letter, comprising:

sending, by a central processor, a drive letter report request to a redundant array of independent disk (RAID) controller;

receiving, by the central processor, a response from the RAID controller, wherein the response carries a number of a port of the RAID controller and an original location number of a disk in a RAID group under the control of the RAID controller, wherein the port of the RAID controller connects to an exchange chip connecting the central processor, and the original location number of the disk is a number of a port connecting the disk to the RAID controller when the RAID group was configured; and determining, by the central processor, a drive letter of the disk by using the number of the port and the original location number, of the disk.

2. The method according to claim 1, wherein the drive letter of the disk comprises two arguments, and the determining a drive letter of the disk by using the number of the port and the original location number, of the disk comprises:

using the number of the port of the RAID controller as one argument in the drive letter, and using the original location number, of the disk as the other argument in the drive letter.

3. A method for determining a drive letter, comprising:

receiving, by a redundant array of independent disk (RAID) controller, a drive letter report request from a central processor;

obtaining, by the RAID controller, a number of a port of the RAID controller and an original location numbers of a disk in a RAID group under the control of the RAID controller, wherein the port of the RAID controller connects to an exchange chip connecting the central processor, and the original location number of the disk is a number of a port connecting the disk to the RAID controller when the RAID group was configured; and sending, by the RAID controller, a response to the central processing unit, wherein the response carries the number of a port of the RAID controller and the original location number of the disk.

4. The method according to claim 3, wherein obtaining, by the RAID controller, an original location numbers of a disk in a RAID group under the control of the RAID controller comprises:

searching for original location numbers of all the disks comprised in the RAID group, when each RAID group was configured, according to current location numbers of all disks in the RAID group; and sorting the original location numbers of all the disks according to the preset sequence, and selecting the original location number of the disk.

5. A non-transitory storage medium configured to store a set of instructions, the set of instructions to direct a central processor to:

send a drive letter report request to a redundant array of independent disk (RAID) controller;

receive a response from the RAID controller, wherein the response carries a number of a port of the RAID controller and an original location number of a disk in a RAID group under the control of the RAID controller, wherein the port of the RAID controller connects to an exchange chip connecting the central processor, and the original location number of the disk is a number of a port connecting the disk to the RAID controller when the RAID group was configured; and determine a drive letter of the disk by using the number of the port and the original location number, of the disk.

6. The non-transitory storage medium according to claim 5, wherein the drive letter of the disk comprises two arguments, and the set of instructions to direct the processor to use the number of the port of the RAID controller as one argument in the drive letter, and use the original location number, of the disk as the other argument in the drive letter.

7. A redundant array of independent disk (RAID) controller, configured to perform at least one of:

receive a drive letter report request from a central processor;

obtain a number of a port of the RAID controller and an original location number of a disk in a RAID group under the control of the RAID controller, wherein the port of the RAID controller connects to an exchange chip connecting the central processor, and the original location number of the disk is a number of a port connecting the disk to the RAID controller when the RAID group was configured; and send a response to the central processor, wherein the response carries the number of a port of the RAID controller and the original location number of the disk.

* * * * *